(12) United States Patent
Chen

(10) Patent No.: US 7,153,016 B2
(45) Date of Patent: Dec. 26, 2006

(54) PACKAGE FOR THE DISPLAY MODULE WITH THE ELECTROMAGNETIC MODULE

(75) Inventor: Chih-An Chen, Taipei (TW)

(73) Assignee: Waltop International Corp., Hsin-Chu (TW)

( * ) Notice: Subject to any disclaimer, the term of this patent is extended or adjusted under 35 U.S.C. 154(b) by 68 days.

(21) Appl. No.: 10/421,884

(22) Filed: Apr. 24, 2003

(65) Prior Publication Data
US 2004/0212979 A1 Oct. 28, 2004

(51) Int. Cl.
F21V 7/04 (2006.01)

(52) U.S. Cl. .............. 362/561; 362/330; 362/614; 349/58

(58) Field of Classification Search ............ 362/27, 362/31, 330, 560, 561, 612, 613, 614; 349/58, 349/61, 62, 65, 66
See application file for complete search history.

(56) References Cited

U.S. PATENT DOCUMENTS 6,220,741 B1 * 4/2001 Kawachi et al. ............ 362/561
6,686,979 B1 * 2/2004 Yoshino .................... 349/58
2003/0016525 A1 * 1/2003 Ono ........................ 362/84

* cited by examiner

Primary Examiner—John Anthony Ward
(74) Attorney, Agent, or Firm—Rosenberg, Klein & Lee

(57) ABSTRACT

This invention discloses a package for a liquid crystal display with the electromagnetic module. This invention provides a package for the liquid crystal display with the electromagnetic module, the package for the liquid crystal display with the electromagnetic module comprises: a lightguide sub-module, an electromagnetic sub-module and a package sub-module; the electromagnetic sub-module further comprises an antenna circuit board with the connectors, a control device; and further the package sub-module comprises a first package-cover and a second package-cover, wherein the first package-cover comprises an opening of an about equivalent lightguide area of the lightguide sub-module, the surface of the second package-cover comprises the second openings. Furthermore, the backlight module with the electromagnetic module in the present invention utilizes a sidewall-fixed method to fix the inside devices.

25 Claims, 4 Drawing Sheets

PACKAGE FOR THE DISPLAY MODULE WITH THE ELECTROMAGNETIC MODULE

BACKGROUND OF THE INVENTION

1. Field of the Invention

The present invention relates generally to a package for the liquid crystal display, and more particularly, relates to the package for the display module with the electromagnetic module.

2. Description of the Prior Art

Development of computer is early spring up from the mainframe, its evolutional period goes through personal computer (PC), notebook, personal digital assistant (PDA) and desknote. Recently, the computer industry has developed the era of Tablet PC is defined a PC between PDA, and notebook. Tablet PC is presented to the public that means Tablet PC is the evolution of the laptop, that is, Tablet PC is similar to a portable PC with a handwriting recognition system. Tablet PC has various especially functions, such as (digital touch panel and digital pen) (saving files in time), that is different with operation function of past PC. Touch screen of a general Table PC can be turned up or down with 180 degree such that the original shape of the notebook product becomes to a portable handwriting liquid crystal panel for user required. Furthermore, in addition to Tablet PC with all of functions of PC, the best feature in Tablet PC is an electromagnetic-induction module thereof. User can perform the handwriting model with touch pen to input data. This operation will be more close to general function of writing and reading for human. User can input and operate on touch screen by only using touch pen. Accordingly, we can offer the best input model in different environments for user. Moreover, Table PC can offer more natural input method to the user that is not familiar with operation of PC by an interface of handwriting, so as to substitute for traditional input method used keyboard, and to reduce barrier of learning PC.

Because a handwriting recognition system could replace the mouse, and is more suitable than the mouse to let the user input words and patterns by user's hands, improvement of the handwriting recognition system is a hot and important field of current computer technology. Generally, the original handwriting recognition system comprises an electromagnetic-induction system, and a conventional electromagnetic-induction system usually comprises an electromagnetic pen and a digital tablet. There is an oscillating circuit that consists of LC in the electromagnetic pen. If the pen point is touched, the amount of inductance will be changed that results in the variation of oscillating frequency. The amount of inductance is increased when touching the pen point and increasing pressure so the variation of oscillating frequency is also increased. Therefore, the variation of the pressure on the pen point can be detected by the variation of oscillating frequency. There are two switches on the sidewall of the electromagnetic pen. The emitted frequency of the electromagnetic pen can be changed with the capacitance variation of the LC device that is produced by pushing down or setting free the switches. Furthermore, the tablet comprises a detector, an amplifier and an analog-digital converter. In the conventional tablet, there is a detected loop in the center region of the tablet, with one-way antennas located on the double faces of the detected loop, wherein the one-way antennas are equidistantly arranged in order by way of using array. The main purpose of the one-way detected loop is only applied to receive the electromagnetic wave that is emitted by the electromagnetic pen. When the electromagnetic pen emits the electromagnetic wave, the one-way antennas receive the electromagnetic wave, and then the tablet can obtain correlative information by the electromagnetic induction.

Nowadays Table PC just utilizes foregoing electromagnetic-induction system so as to enable to handwriting input. Usually there are two organized structures in general Table PC, one is a liquid crystal display with a backlight module, and the other is the electromagnetic-induction system with antenna circuit. A conventional antenna circuit board 100 is shown in FIG. 1A, there are only one or two connectors in the peripheral region, and the connectors 110 are coupled with a controller 120 by data bus. However, for including both a backlight module and an electromagnetic module, it is necessary to improve a conventional package back-cover 130 of the backlight module; for example, increasing the first dotted line area 130A contains the connectors 110 and the data bus. Furthermore, the conventional package back-cover 130 utilizes the front-fixed method, as the arrow direction shown in FIG. 1B, and the front-fixed method must make more area of the package back-cover 130 for vacating the area of the front-join, such as the second dotted line area 130B. Regarding advanced technology industry, the shrinkage of product is one of important milestone of development. However, it is difficult to arrive at the objective for the above conventional package. Furthermore, for combining the foregoing electromagnetic module, it is necessary for redeveloping the package for the backlight module of the liquid crystal display, even it is necessary to redeveloped the profile of the backlight module of the liquid crystal display for combining the electromagnetic module, it is not only complicated process, time-consuming and source-consuming but also increased a lot of development cost, and can not arrive at the utilizing value of industry.

SUMMARY OF THE INVENTION

In accordance with the above description of the skills in prior art, the present invention provides a package of the display module with the electromagnetic-induction module to shrinking the dimension of product, reducing process cost, and enhancing the product quality, so as to improve the problems that are resulted from conventional package structure.

One object of the present invention is to provide a package for a liquid crystal display with the electromagnetic module. The present invention forms the openings in the package back-cover that is opposite to the position of the connectors of the electromagnetic module, so as to stretch out the data bus the connectors via the openings of the package back-cover, whereby the simplified structure avoids the expensive cost of redeveloping. Furthermore, the present invention utilizes a sidewall-fixed method to fix the package of the display module for shrinking the request area of the front-join, whereby the product's size can be shrunk, and get the largest area of the display in the same size of product standard. Furthermore, the present invention utilizes the electromagnetic module with the smaller connectors of the antenna circuit board to shrink the unnecessary area, so as to place it between two light source devices of the display module to shrink the size and thickness of product. In view of the above, the present invention provides a package for the display module to shrink the size and thickness of product and the request area, so as to reduce process cost, enhance the product yield, improve the penetration efficiency of the electromagnetic-induction. Therefore, the present invention can satisfy the economical efficiency and industrial utility.

In accordance with the above description, this invention discloses a package for a liquid crystal display with the electromagnetic module. This invention provides a package for the liquid crystal display with the electromagnetic module, the package for the liquid crystal display with the electromagnetic module at least comprises: a lightguide sub-module, an electromagnetic sub-module and a package sub-module. The electromagnetic sub-module further comprises an antenna circuit board with the connectors, a control device. The package sub-module comprises a first package-cover and a second package-cover, wherein the first package-cover comprises an opening of an about equivalent lightguide area of the lightguide sub-module, the surface of the second package-cover comprises the second openings. Furthermore, the backlight module with the electromagnetic module in the present invention utilizes a sidewall-fixed method to fix the inside devices.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DESCRIPTION OF THE PREFERRED EMBODIMENT

What is probed into in the invention is a package for a liquid crystal display with the electromagnetic module. Detailed steps in production, structure and elements will be provided in the following description in order to make the invention thoroughly understood. Obviously, the application of the invention is not confined to specific details familiar to those who are skilled in the liquid crystal display or the electromagnetic system. On the other hand, the common elements and procedures that are known to everyone are not described in the details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1A:
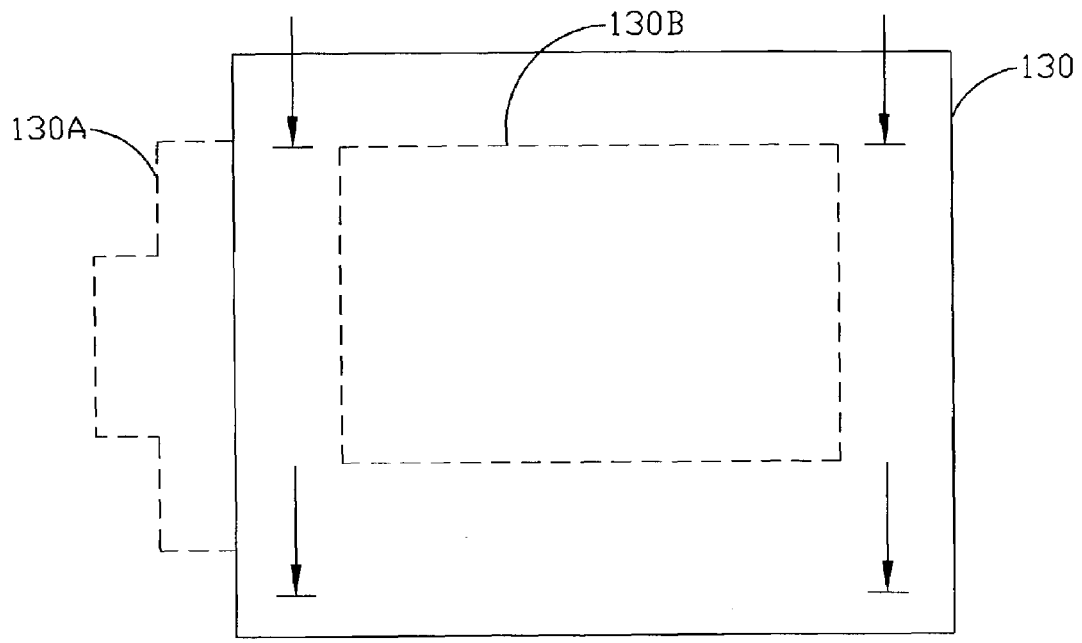
FIG. 1A and FIG. 1B show two cross-sectional views illustrative of the conventional the antenna circuit board.
Figure 1B:
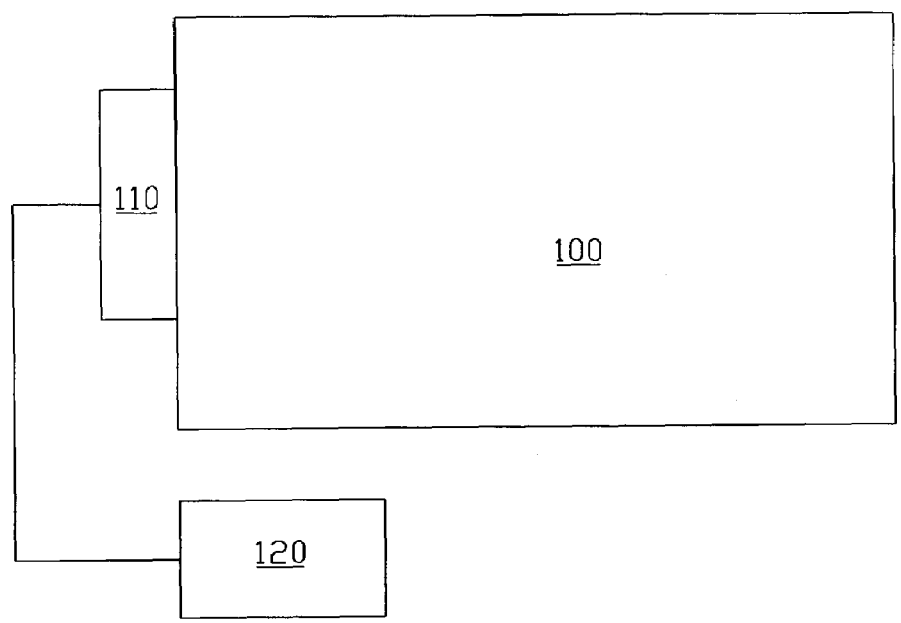
Figure 2B:
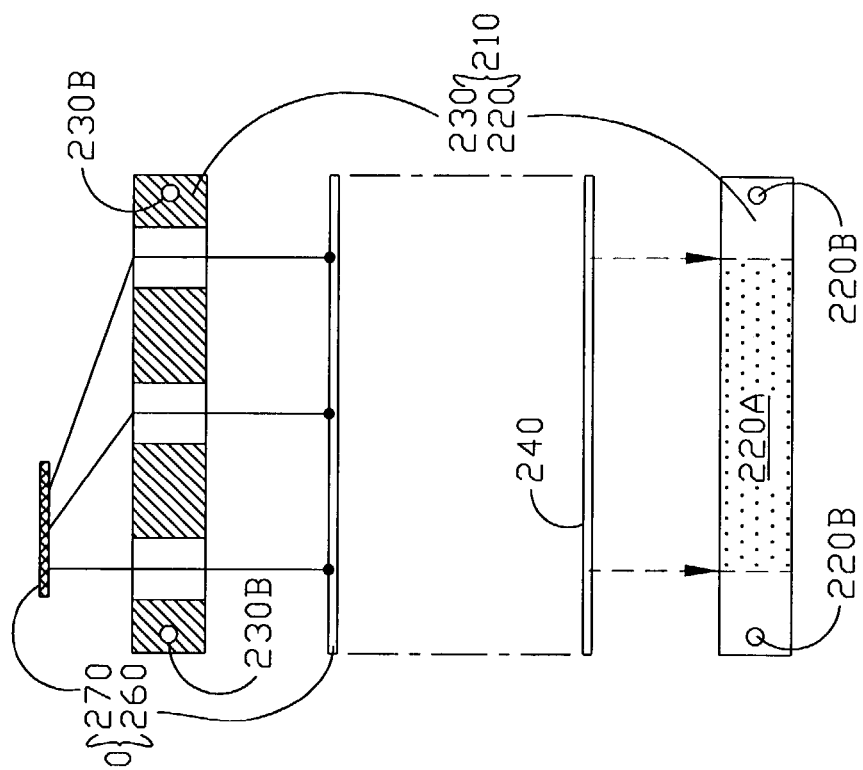
FIG. 2B shows a cross-sectional view illustrative of the package for the backlight module with the electromagnetic sub-module in accordance with the first preferred embodiment.
Figure 2A:
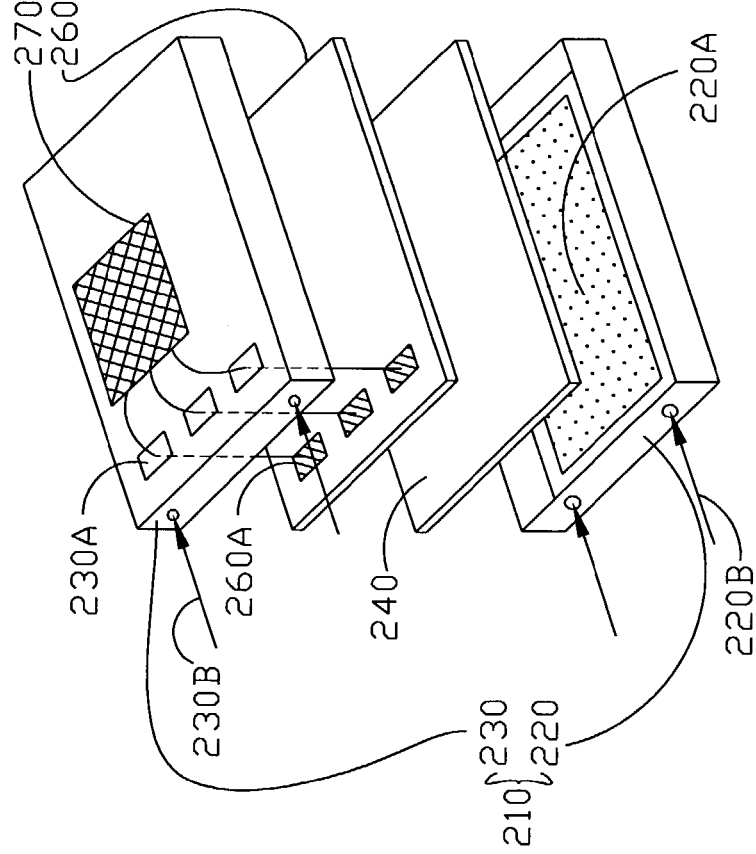
FIG. 2A shows a cross-sectional view illustrative of the package for the backlight module with the electromagnetic sub-module in accordance with the first preferred embodiment.
Figure 2C:
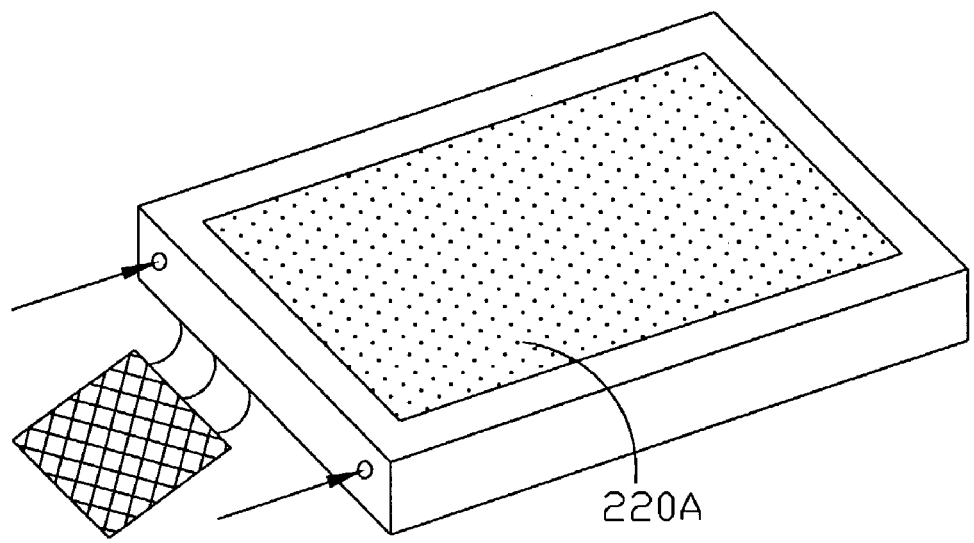
FIG. 2C and FIG. 2D show two cross-sectional views illustrative of the package for the backlight module with the electromagnetic sub-module in the finished products in accordance with the first preferred embodiment.
Figure 2D:
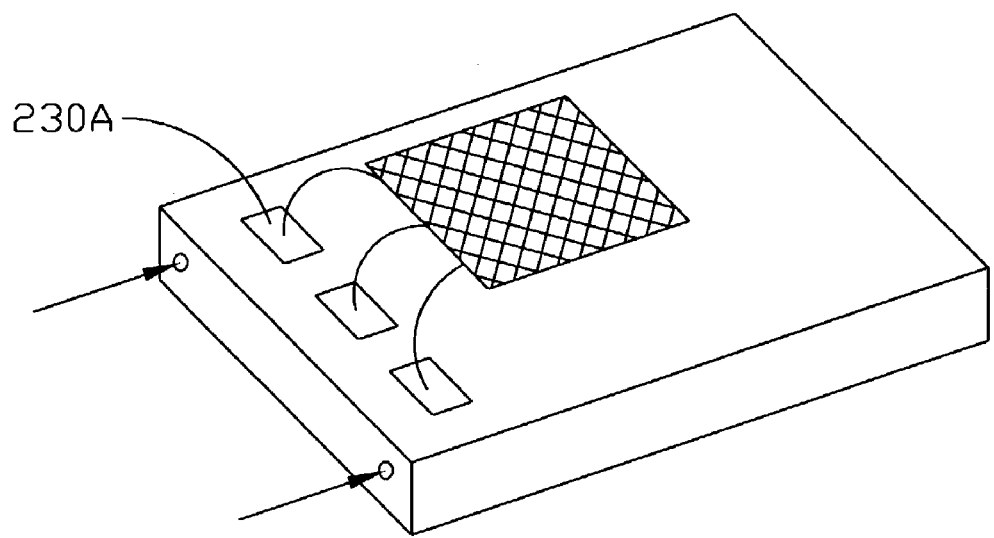

As illustrated in FIGS. 2A and 2B, in the first preferred embodiment of the present invention, this invention provides a package for the backlight module with the electromagnetic sub-module 250. The package for the backlight module comprises: a package sub-module 210, the package sub-module 210 further comprises a first package-cover 220 and a second package-cover 230, wherein the first package-cover 220 usually is a frame of the liquid crystal display, the second package-cover 230 usually is an aluminum back-cover. The first package-cover 220 comprises a first opening 220A in the bottom, and the first fixed openings 220B in the sidewall. The second package-cover 230 comprises the second openings 230A and a second fixed openings 230B in the sidewall, wherein the amount of the first fixed openings 220B is equal to the amount of the second fixed openings 230B, and the positions of the first fixed openings and the second fixed openings are opposite so as to fix the whole package for the backlight module. Furthermore, the package for the backlight module further comprises a lightguide sub-module 240 located on the first package-cover 220. The lightguide area of the lightguide sub-module 240 can be exposed by the first opening 220A of the first package-cover 220, and the area of the first opening 220A is about equal to the lightguide area of the lightguide sub-module 240. The package for backlight module further comprises an electromagnetic sub-module 250. The electromagnetic sub-module 250 further comprises an antenna circuit board 260 with the connectors 260A, and a control device 270, wherein the antenna circuit board 260 is located on the lightguide sub-module 240 and under the second package-cover 230. The position of the second openings 230A and the connectors 260A of the antenna circuit board 260 are individually opposite, and the amount of the second openings 230A is equal to the amount of the connectors 260A. The control device 270 is located on the outside of the second package-cover 230, and the control device 270 utilizes an circuit connector to couple with the connectors 260A of the antenna circuit board 260 via the second openings 230A of the second package-cover 230. On the other hand, the foregoing whole profile of the package for the backlight module is also illustrated in FIG. 2C, and the fixed method of the package further comprises a sidewall-fixed method, such as the arrows direction illustrated in FIG. 2C and FIG. 2D. Excluding controlling the function of the electromagnetic sub-module 250, the control device 270 of the preferred embodiment in the present invention further comprises the function of controlling the liquid crystal display.

Figure 3:
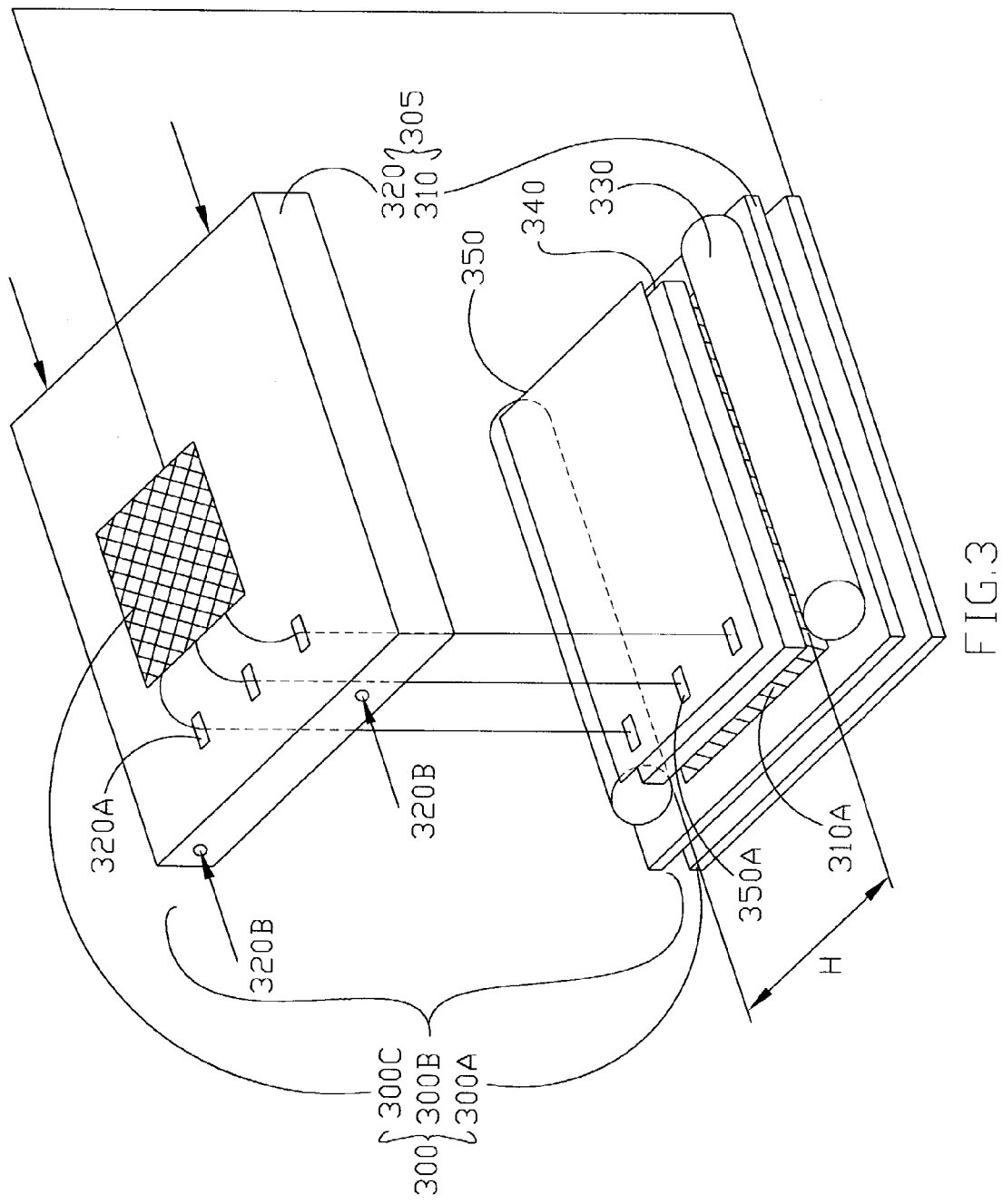
FIG. 3 shows a cross-sectional view illustrative of the package for the liquid crystal display with the electromagnetic sub-module in accordance with the second preferred embodiment.

As illustrated in FIG. 3, in the second preferred embodiment of the present invention, this invention provides a package for the liquid crystal display apparatus 300 with the electromagnetic module, and the package for the liquid crystal display apparatus 300 comprises a display module 300A, a backlight module 300B, and a control module 300C. The package for the backlight module 300B at least comprises a package sub-module 305. The package sub-module 305 further comprises a first package-cover 310 and a second package-cover 320, wherein the first package-cover 310 usually is a frame of the liquid crystal display, and the second package-cover 320 usually is an aluminum back-cover. The first package-cover 310 comprises a first opening 310A in the bottom, and a plurality of light source devices 330 along the edge of the first opening 310A of the first package-cover 310. The display module 300A is located under the first package-cover 310. The display module 300A further comprises a liquid crystal display. The second package-cover 320 comprises the second openings 320B in the sidewall. Furthermore, the package for the backlight module 300B further comprises a lightguide sub-module 340 located on the first package-cover 310. The lightguide area of the lightguide sub-module 340 can be exposed by the first opening 310A of the first package-cover 310, and the area of the first opening 310A must be about equal to the lightguide area of the lightguide sub-module 340. Moreover, the package for backlight module 300B further comprises an electromagnetic sub-module 350. The electromagnetic sub-module 350 further comprises the connectors 350A. The electromagnetic sub-module 350 is located on the lightguide sub-module 340 and under the second package-cover 320, wherein the position of the second openings 320A in the second package-cover 320 and the connectors 350A of the electromagnetic sub-module 350 are individually opposite, the amount of the second openings 320A is equal to the amount of the connectors 350A. Furthermore, the lightguide sub-module 340 and the electromagnetic sub-module 350 are placed in the surrounded scope of H area in the light source devices 330. The control module 300C is located on the outside of the second package-cover 320, and coupled with the connectors 350A of the electromagnetic sub-module 350 via the second openings 320A of the second package-cover 320, wherein the control module 300C is coupled with the display module 300A. On the other hand, the package for the backlight module 300B of the preferred embodiment in the present invention utilizes the sidewall-fixed method to fix by the fixed openings 320B, such as the arrows direction illustrated in FIG. 3.

In this embodiment of the present invention, as discussed above, this invention utilizes a package-cover with the openings to proceed a new package process in order to form a new package, and the simplified structure to avoid the expensive redevelopment cost. Furthermore, this invention also utilizes a sidewall-fixed method to fix a package of the display module for shrinking the request area by the front-fixed method, whereby product's size can be shrunk, and get the largest area of the display in the same of product standard. Furthermore, the present invention utilizes the antenna circuit board with the smaller connectors in the electromagnetic module to shrink the needless area, that directly place it between the two light source devices in the display module to shrink the size and thickness of product. In view of the above, the present invention provides a package for the display module to shrink the size and thickness of product and the request area, so as to reduce process cost, enhance the product yield, strengthen penetration efficiency of the electromagnetic-induction. Therefore, the present invention satisfies the economical efficiency and industrial utility. Certainly, the present invention also can utilize the design rule with devices of any electromagnetic system in addition to the liquid crystal display apparatus. Furthermore, the present invention utilizes a new package to arrive at the requests of shrinking the size and thickness of product, that is not utilize in the field of the package process of the electromagnetic device and the display device until nowadays.

Although a specific embodiment has been illustrated and described, it will be obvious to those skilled in the art that various modifications may be made without departing from what is intended to be limited solely by the appended claims. Obviously, many modifications and variations of the present invention are possible in light of the above teachings. It is therefore to be understood that within the scope of the appended claims, the present invention may be practiced otherwise than as specifically described herein.

What is claimed is:

1. A package for a display module with an electromagnetic module, said package for said display module with said electromagnetic module comprising:
    a package sub-module having a first package-cover and a second package-cover, wherein said first package-cover has a first opening, and said second package-cover has a plurality of second openings;
    a lightguide sub-module located on said first opening of said first package-cover; and
    an electromagnetic sub-module having a plurality of connectors, an antenna circuit board located on said lightguide sub-module and a control device located on the outside of said second package-cover, and said electromagnetic sub-module is located on said lightguide sub-module, said second package-cover is located on said antenna circuit board, and said control device is coupled with said plurality of connectors of said antenna circuit board via said plurality of second openings of said second package-cover, wherein the position of said plurality of second openings of said second package-cover and the position of said plurality of connectors of said electromagnetic sub-module are individually opposite.

2. The package for said display module with said electromagnetic module according to claim 1, wherein the lightguide area of said lightguide sub-module is about equal to the area of said first opening of said first package-cover.

3. The package for said display module with said electromagnetic module according to claim 1, wherein the amount of said plurality of second openings is equal to the amount of said plurality of connectors.

4. A package for a backlight module with an electromagnetic module, said package for said backlight module with said electromagnetic module comprising:
    a first package-cover having a first opening;
    a second package-cover having a plurality of second openings;
    a lightguide sub-module located on said first package-cover, wherein the lightguide area of said lightguide sub-module is located on said first opening of said first package-cover, so as to expose said lightguide area, and said lightguide area of said lightguide sub-module is about equal to said area of said first opening in said first package-cover;
    an antenna circuit board with a plurality of connectors, said antenna circuit board is located on said lightguide sub-module, said second package-cover is located on said antenna circuit board, and the amount of said plurality of second openings is equal to the amount of said plurality of connectors, wherein the position of said plurality of second openings of said second package-cover and the position of said plurality of connectors of said antenna circuit board are individually opposite; and
    a control device located on the outside of said second package-cover, said control device is coupled with said plurality of connectors of said antenna circuit board via said plurality of second openings of said second package-cover.

5. A package for a liquid crystal display apparatus with an electromagnetic module, said package for said liquid crystal display apparatus with said electromagnetic module comprising:
    a package sub-module having a first package-cover and a second package-cover, wherein said first package-cover has a first opening, and said second package-cover has a plurality of second openings;
a display module is located under said first package-cover, wherein said first package-cover has said first opening in a bottom thereof, and said second package-cover has a plurality of second openings in a surface thereof, said lightguide sub-module is located on said first package-cover;
a backlight module having a lightguide sub-module wherein said first package-cover is between said display module and said lightguide sub-module; and
an electromagnetic sub-module located on said lightguide sub-module, wherein said electromagnetic sub-module is located under said second package-cover.

6. The package for said liquid crystal display apparatus with said electromagnetic module according to claim 5, wherein said display module comprises a liquid crystal display.

7. The package for said liquid crystal display apparatus with said electromagnetic module according to claim 5, wherein said first package-cover is a frame of a liquid crystal display.

8. The package for said liquid crystal display apparatus with said electromagnetic module according to claim 5, wherein said second package-cover is an aluminum back-cover.

9. The package for said liquid crystal display apparatus with said electromagnetic module according to claim 5, wherein the edge of said first opening comprises a plurality of light source devices.

10. The package for said liquid crystal display apparatus with said electromagnetic module according to claim 9, wherein said lightguide sub-module and said electromagnetic sub-module are placed in the surrounded scope of the area of said plurality of light source devices.

11. The package for said liquid crystal display apparatus with said electromagnetic module according to claim 5, wherein said second package-cover further comprises a plurality of fixed openings in the sidewall thereof.

12. The package for said liquid crystal display apparatus with said electromagnetic module according to claim 11, wherein whole of said package of said backlight module is fixed by said plurality of fixed openings.

13. The package for said liquid crystal display apparatus with said electromagnetic module according to claim 5, wherein said lightguide area of said lightguide sub-module is exposed by said first opening.

14. The package for said liquid crystal display apparatus with said electromagnetic module according to claim 13, wherein said area of said first openings is about equal to said lightguide area.

15. The package for said liquid crystal display apparatus with said electromagnetic module according to claim 5, wherein said electromagnetic sub-module comprising:
an antenna sub-circuit, wherein said antenna sub-circuit has a plurality of connectors, and said antenna sub-circuit is located on said lightguide sub-module; and
a control sub-circuit located on the outside of said plurality of second openings, wherein said control module is coupled with said backlight module via said plurality of second openings.

16. The package for said liquid crystal display apparatus with said electromagnetic module according to claim 15, wherein the position of said plurality of connectors and the position of said plurality of second openings are individually opposite, and the amount of said plurality of second openings is equal to the amount of said plurality of connectors.

17. A package for said liquid crystal display apparatus with said electromagnetic module, said package for said liquid crystal display apparatus with said electromagnetic module comprising:
a display module;
a backlight module having a first package-cover and a second package-cover, said first package-cover having a first opening and said second package-cover having a plurality of second openings in the surface, and a lightguide sub-module located on said first package-cover, wherein said display module is located on the surface of said first opening of said first package-cover that located between said display module and said lightguide sub-module; and
a control module located on the outside of said plurality of second openings, wherein said control module is coupled with said backlight module via said plurality of second openings, and said control module is coupled with said display module.

18. The package for said liquid crystal display apparatus with said electromagnetic module according to claim 17, wherein said display module comprises a liquid crystal display.

19. The package for said liquid crystal display apparatus with said electromagnetic module according to claim 17, wherein said backlight module further comprising:
a plurality of light source device along the edge of the area of said first opening of said first package-cover; and
an electromagnetic sub-module located on said lightguide sub-module and under said second package-cover, said electromagnetic sub-module with a plurality of connectors is coupled with said control module, wherein said lightguide sub-module and said electromagnetic sub-module are placed in the surrounded scope of the area of said plurality of light source devices.

20. The package for said liquid crystal display apparatus with said electromagnetic module according to claim 17, wherein said first package-cover is a frame of a liquid crystal display.

21. The package for said liquid crystal display apparatus with said electromagnetic module according to claim 17, wherein said second package-cover is an aluminum back-cover.

22. The package for said liquid crystal display apparatus with said electromagnetic module according to claim 17, wherein said second package-cover further comprises a plurality of fixed openings in the sidewall thereof.

23. The package for said liquid crystal display apparatus with said electromagnetic module according to claim 22, wherein whole of the package for said backlight module is fixed by said plurality of the fixed openings.

24. The package for said liquid crystal display apparatus with said electromagnetic module according to claim 17, wherein a lightguide area of said lightguide sub-module is exposed by said first opening, and the area of said first opening is about equal to said lightguide area of said lightguide sub-module.

25. The package for said liquid crystal display apparatus with said electromagnetic module according to claim 19, wherein the position of said plurality of connectors and the position of said plurality of said the second openings are individually opposite, and the amount of said plurality of second openings is equal to the amount of said plurality of connectors.

* * * * *